US006790394B2

(12) United States Patent
Kim et al.

(10) Patent No.: US 6,790,394 B2
(45) Date of Patent: Sep. 14, 2004

(54) METHOD FOR MANUFACTURING PLASTIC-SUBSTITUTE GOODS BY USING NATURAL MATERIALS

(76) Inventors: Young Bok Kim, 102-101, Mia Hyundai Apt., 190-2 (6-5), Mia-dong, Kangbuk-ku, Seoul (KR); Myung Ja Kim, 102-101, Mia Hyundai Apt., 190-2 (6-5), Mia-dong, Kangbuk-ku, Seoul (KR)

( * ) Notice: Subject to any disclaimer, the term of this patent is extended or adjusted under 35 U.S.C. 154(b) by 8 days.

(21) Appl. No.: 10/168,640

(22) PCT Filed: May 22, 2001

(86) PCT No.: PCT/KR01/00844

§ 371 (c)(1),
(2), (4) Date: Mar. 21, 2003

(87) PCT Pub. No.: WO02/083386

PCT Pub. Date: Oct. 24, 2002

(65) Prior Publication Data

US 2003/0155690 A1 Aug. 21, 2003

(30) Foreign Application Priority Data

Apr. 17, 2001 (KR) ........................................ 2001/20374

(51) Int. Cl.[7] ........................... B29B 9/02; B29B 11/12; B29B 11/14

(52) U.S. Cl. ....................... 264/115; 264/118; 264/122; 264/123; 264/126

(58) Field of Search ................................. 264/109–128

(56) References Cited

U.S. PATENT DOCUMENTS

| | | | | | |
|---|---|---|---|---|---|
| 5,411,691 | A | * | 5/1995 | Hwang | 264/115 |
| 6,475,416 | B2 | * | 11/2002 | Kim et al. | 264/115 |
| 6,537,474 | B1 | * | 3/2003 | Kim et al. | 264/115 |

* cited by examiner

*Primary Examiner*—Stephen J. Lechert, Jr.
(74) *Attorney, Agent, or Firm*—IP Strategies, P.C.

(57) ABSTRACT

A method for manufacturing plastic-substitute goods by using natural materials is disclosed. Agricultural byproducts and wood byproducts such as rice husks, rice plant stems, corn plant stems, bean plant stems, wheat plant stems, saw dust and the like and the washed and dried sludge produced from the alcoholic factory are crushed into a particular size, then the crushed particles are mixed with natural adhesives (such as corn starch, potato starch and the like), and are coated with melamine resin or urea resins, and then a molding is carried out by applying a pressure in a molding machine, thereby manufacturing the plastic-substitute goods. The raw materials of the present invention are readily available from the rural areas, and the molding is carried out at a temperature of 100–300 degrees C.

14 Claims, No Drawings

METHOD FOR MANUFACTURING PLASTIC-SUBSTITUTE GOODS BY USING NATURAL MATERIALS

CROSS-REFERENCE TO RELATED APPLICATION

Applicant claims priority under 35 USC §371 of Korean Patent Application 2001-0020374, filed on Apr. 17, 2001, as a National Stage filing of PCT/KR01/00844, which was filed on May 22, 2001.

FIELD OF THE INVENTION

The present invention relates to a method for manufacturing plastic-substitute goods by using natural materials. Particularly, the invention relates to a method for manufacturing plastic-substitute goods by using natural materials, in which agricultural byproducts and wood byproducts such as rice husks, rice plant stems, corn plant stems, bean plant stems, wheat plant stems, saw dust and the like and the washed and dried sludge produced from the alcoholic factory are crushed into a particular size, then the crushed particles are mixed with natural adhesives (such as corn starch, potato starch and the like), and are coated with melamine resins or urea resins, and then a molding is carried out by applying a pressure in a molding machine, thereby manufacturing the natural plastic-substitute goods.

BACKGROUND OF THE INVENTION

There are various everyday goods which are made of plastic materials. Further, their shape and use are diversified, and have been continuously developed. However, the plastic materials are highly combustible, and therefore, in case of a fire accident, they are speedily burned off without allowing the fire fighting time. Further, when they are burned, toxic gases are generated to sacrifice human lives. When they are discarded, they are not decomposed, with the result that the natural environment is contaminated.

SUMMARY OF THE INVENTION

The present invention is intended to overcome the above described disadvantages of the conventional practice.

Therefore it is an object of the present invention to provide a method for manufacturing plastic-substitute goods by using natural materials, in which one or more materials are selected from among agricultural byproducts and wood byproducts such as rice husks, rice plant stems, corn plant stems, bean plant stems, wheat plant stems, saw dust and the like and and the dried sludge produced from the alcoholic factory, then they are washed, sorted and dried, then they are mixed with natural adhesives such as corn starch, potato starch and the like, then they are dried and crushed, then they are mixed with a coating material such as melamine resins or urea resins, and then, they are press-molded in a molding machine.

The agricultural byproducts and the wood byproducts can be selectively used, and the rice husks, rice plant stems and other plant byproducts can be mixedly used.

As the natural adhesive, there can be used corn starch and potato starch, but other cereal powder may be used to reap the same effect. Corn starch and potato starch are preferred because they are cheap. The substitute materials are crude in their touching sense and in the color, and therefore, they can be dyed.

Melamine resin or urea resin is a thermosetting resin which is formed by reaction of melamine or urea acting upon formaldehyde. A first mixture is produced by mixing formaldehyde solution 30 wt % and water 70 wt %. A second mixture is then achieved by mixing the first mixture at 70 wt % with melamine or urea 30 wt % and heating the result at a temperature of 350 degrees Centigrade. Then the resulting substance is mixed at 60 wt % with cellulose powder 40 w %. After drying and powdering this outcome, melamine resin or urea resin is obtained. The alkaline attribute of the formaldehyde liquid has a poisonous character, which is eliminated by heating at a high temperature after mixing in the melamine or urea.

Said melamine resin and urea resin are generally called amino plastic because they have —NH2, the amino radical. These resins are colorless, transparent, easily colored, water-resisting and thermostable.

Further, when molding the product of the present invention, the product can be easily separated from the molding die owing to the presence of melamine resin or urea resin, and therefore, the melamine or urea resin facilitating molding, separating and water-resisting of receptacle is an important element in the present invention. In the present invention, the molding is carried out at a temperature of 100–350 degrees C., the internal pressure is preferably 5 $Kg/Cm^2$, and the molding speed is 30–80 seconds per product.

The agricultural byproducts, the wood byproducts and other plant byproducts are mostly waste materials, and therefore, can be easily obtained. However, their availabilities are affected by seasons, and therefore, the most readily available materials in the season can be selectively used.

DETAILED DESCRIPTION OF THE PREFERRED EMBODIMENTS

The composition of the material of the present invention includes: one or more materials are selected from among agricultural byproducts such as rice husks, rice plant stems, corn plant stems, bean plant stems, wheat plant stems and the like, or wood byproducts such as saw dust and the like; the washed and dried sludge produced from the alcoholic factory; natural adhesives such as corn starch, potato starch and the like; and a coating material such as, melamine resin or urea resin and the like.

The process for manufacturing the plastic-substitute goods by using natural materials according to the present invention includes: a material washing step; a washed material drying step; a step of dipping the dried materials into a glue; a step of drying the materials after the dipping into the glue; a step of crushing the dried materials; a step of mixing the crushed particles with a coating material; and a step of molding the mixed materials.

The chemical compositions of the materials of the present invention will be analyzed in detail below. They were analyzed by the Korea Institute of Science and Technology as to its chemical composition.

Therefore, the data which was prepared by the Korea Institute of Science and Technology will be referred to.

Tables 1 and 2 analyze the ingredient materials which constitute the container made of rice husks and melamine resin or urea resin; and analyze the substances which are generated when burning the container.

<Experiment 1>

Table 1. Analysis of the materials constituting the container

TABLE 1

Analysis of the materials constituting the container

| Test Piece | Analyzed items unit: SiO2 | Mass Decrease at heating | Pb | Cd | As | Hg | Cu | |
|---|---|---|---|---|---|---|---|---|
| Material Test | 10.8 | 88.3 | 0.0005 or less | 0.00005 or less | 0.0005 or less | 0.000005 or less | 0.0011 | |
| (*) | (I) | WET | AAS | AAS | ICP | AAS | AAS | |
| Unit | wt % | wt % | wt % | wt % | wt % | wt % | wt % | |
| Elution | KmnO4 consptn | Phenols | Formal-dehyde | Diazinon | Parathion | Carbaryl | Fenitro-thion | Malathion |
| | 1.5 | 0.047 | 0.7 | 0.001 or less | 0.001 or less | 0.005 or less | 0.001 or less | 0.001 or less |
| (*) | wet | sp | Sp | Gc | gc | Gc | gc | gc |
| Unit | mg/l | mg/l | Mg/l | mg/l | mg/l | mg/l | mg/l | mg/l |

In the above table, the heavy metals which are harmful to the human body are classified. Only silicon dioxide is 10.8 wt %, lead (Pb) is 0.0005 wt % or less, cadmium (Cd) is 0.00005 wt % or less, arsenic (As) is 0.0005 wt % or less, mercury (Hg) is 0.000005 wt % or less, copper (Cu) is 0.0011 or less. Thus the heavy metals are less than the standard values, and therefore, they cannot give toxicity to the human body. Silicon dioxide corresponds to the quartz sand, and therefore, it is not harmful to the human body at all probability. Therefore, the ingredient materials which constitute the material of the present invention are not harmful to the human body as can be seen in Table 1 above.

Table 2 below shows the measurements of the environment polluting materials by Chungyong Environment Co., Ltd. so as to see the environment polluting degrees of the substances which are generated during the burning of the container which is made of the rice husks.

<Experiment 2>

Table 2. Measurement of environment pollution during the burning

TABLE 2

Measurement of environment pollution during the burning

| Items | Standard | Measured result | Measuring Method | RMKS |
|---|---|---|---|---|
| NH3 | 100 ppm | ND | Environment pollution test method | |
| CO | 600(12) ppm | 428.6 | " | |
| HCL | 50(12) ppm | 9.76 | " | |
| C12 | 60(12) ppm | 11.5 | " | |
| Sox | 300(12) ppm | ND | " | |
| NOX | 200 ppm | 62.0 | " | |
| CS2 | 30 ppm | 0.75 | " | |
| HCHO | 20 ppm | 3.3 | " | |
| H2S | 15 ppm | ND | " | |
| F | 3 ppm | ND | " | |
| HCN | 10 ppm | 2.44 | " | |
| Br | 5 ppm | ND | " | |
| C6H6 | 50 ppm | ND | " | |
| C6H50H | 10 ppm | ND | " | |
| Hg | 5 mg/Sm$^3$ | ND | " | |
| As | 3 ppm | ND | " | |
| DUST | 100(12) mg/Sm$^3$ | 13.5 | " | |
| Cd | 1.0 mg/Sm$^3$ | 0.003 | " | |

TABLE 2-continued

Measurement of environment pollution during the burning

| Items | Standard | Measured result | Measuring Method | RMKS |
|---|---|---|---|---|
| Pb | 5.0 mg/Sm$^3$ | 0.014 | " | |
| Cr | 1.0 mg/Sm$^3$ | 0.118 | " | |
| Cu | 10 mg/Sm$^3$ | ND | " | |
| Ni | 20 mg/Sm$^3$ | 0.044 | " | |
| Zn | 30 mg/Sm$^3$ | 0.48 | " | |
| O2 | — | 5.4% | " | |

*The combustion rate was 81.5%.

As can be seen in Table 2 above, the density of the containers was high, and therefore, carbon monoxide (CO) was slightly generated during the burning. However, it was far short of the standard pollution value, and therefore, the container is a non-polluting material as can be seen in Tables 1 and 2 above.

Therefore, as can be seen in the comparison of Tables 1 and 2, the materials of the present invention are also non-polluting materials.

Now the method for manufacturing the plastic-substitute goods by using the natural materials according to the present invention will be described based on actual examples.

EXAMPLE 1

Rice husks were washed to a clean state. The rice husks thus washed were dried to a drying degree of 98%. Meanwhile, 20 wt % of a starch was mixed with 80 wt % of water. This mixture was agitated, so that the starch and water could be uniformly mixed.

After the confirmation of the agitation result, an aging was carried out while slowly heating the mixture up to 100 degrees C. in such a manner that the mixture would not be burned. When the mixture of the starch and water was heated, it became a glue.

It was made sure that the glue would not be agglomerated, and thus, the required viscosity of the glue was maintained.

The dried rice husks were mixed with the glue, and then, an agitation was carried out, so that the rice husks would be completely mixed with the glue.

When it was confirmed that the rice husks and the glue were sufficiently mixed together, the mixture was dried to a drying degree of 98%. Here, the proportion of the starch glue was 20 wt %, while that of the rice husks was 80 wt %. After drying the mixture, it was crushed to a size range of 0.01 mm–0.1 mm.

Then 70 wt % of the husk-starch mixture was mixed with 15 wt % of water and 15 wt % of melamine resin or urea resin to form the final mixture. The melamine resin or urea resin is made as follows. A first mixture is produced by mixing water 70 wt % and formaldehyde solution 30 wt %. A second mixture is then achieved by mixing the first mixture at 70 wt % with melamine or urea 30 wt % and heating the result at a temperature of 350 degree Centigrade. Then the resulting substance is mixed at 60 wt % with cellulose powder 40 wt %. After drying and powdering this outcome, melamine resin or urea resin is obtained. Then the final mixture was molded by a molding machine at a temperature of 100–350 degrees C. and at a pressure of 5 $Kg/Cm^2$. The product was molded at a frequency of 30–80 seconds.

EXAMPLE 2

Rice plant stems were cut to a certain length (3–5 cm). Then the cut stems were cleanly washed. The washed stems were dried to drying degree of 98%.

Meanwhile, 20 wt % of a starch was mixed with 80 wt % of water. This mixture was agitated, so that the starch and water could be uniformly mixed.

After the confirmation of the agitation result, an aging was carried out while slowly heating the mixture up to 100 degrees C. in such a manner that the mixture would not be burned. When the mixture of the starch and water was heated, it became a glue.

It was made sure that the glue would not be agglomerated, and thus, the required viscosity of the glue was maintained.

The dried rice plant stems were mixed with the glue, and then, an agitation was carried out, so that the rice plant would be completely mixed with the glue.

When it was confirmed that the rice plant and the glue were sufficiently mixed together, the mixture was dried to a drying degree of 98%. Here, the proportion of the starch glue was 20 wt %, while that of the rice plant was 80 wt %. After drying the mixture, it was crushed to a size range of 0.01 mm–0.1 mm.

Then 70 wt % of the rice plant-starch mixture was mixed with 15 wt % of water and 15 wt % of melamine resin or urea resin. The melamine resin or urea resin is made as follows. A first mixture is produced by mixing water 70 wt % and formaldehyde solution 30 wt %. A second mixture is then achieved by mixing the first mixture at 70 wt % with melamine or urea 30 wt % and heating the result at a temperature of 350 degrees Centigrade. Then the resulting substance is mixed at 60 wt % with cellulose powder 40 wt %. After drying and powdering this outcome, melamine resin or urea resin is obtained. Then the final mixture was molded by a molding machine at a temperature of 100–350 degrees C. and at a pressure of 5 $Kg/Cm^2$. The product was molded at a frequency of 30–80 seconds.

EXAMPLE 3

Saw dusts were cleanly washed. Then the washed saw dusts were dried to a drying degree of 98%.

Meanwhile, 20 wt % of a starch was mixed with 80 wt % of water. This mixture was agitated, so that the starch and water could be uniformly mixed.

After the confirmation of the agitation result, an aging was carried out while slowly heating the mixture up to 100 degrees C. in such a manner that the mixture would not be burned. When the mixture of the starch and water was heated, it became a glue.

It was made sure that the glue would not be agglomerated, and thus, the required viscosity of the glue was maintained.

The dried saw dusts were mixed with the glue, and then, an agitation was carried out, so that the saw dusts would be completely mixed with the glue.

When it was confirmed that the saw dusts and the glue were sufficiently mixed together, the mixture was dried to a drying degree of 98%. Here, the proportion of the starch glue was 20 wt %, while that of the saw dusts was 80 wt %. After drying the mixture, it was crushed to a size range of 0.01 mm–0.1 mm.

Then 70 wt % of the saw dust-starch mixture was mixed with 15 wt % of water and 15 wt % of melamine resin or urea resin. The melamine resin or urea resin is made as follows. A first mixture is produced by mixing water 70 wt % and formaldehyde solution 30 wt %. A second mixture is then achieved by mixing the first mixture at 70 wt % with melamine or urea 30 wt % and heating the result at a temperature of 350 degrees Centigrade. Then the resulting substance is mixed at 60 wt % with cellulose powder 40 wt %. After drying and powdering this outcome, melamine resin or urea resin is obtained. Then the final mixture was molded by a molding machine at a temperature of 100–350 degrees C. and at a pressure of 5 $Kg/Cm^2$. The product was molded at a frequency of 30–80 seconds.

EXAMPLE 4

Corn plant stems were cut into a length range of 3–5 cm. Then the cut corn plant stems were cleanly washed, and then, the washed corn plant stems were dried to a drying degree of 98%.

Meanwhile, 20 wt % of a starch was mixed with 80 wt % of water. This mixture was agitated, so that the starch and water could be uniformly mixed. That is, the agitation was carried out while visually checking the mixing degree.

After the confirmation of the agitation result, an aging was carried out while slowly heating the mixture up to 100 degrees C. in such a manner that the mixture would not be burned. When the mixture of the starch and water was heated, it became a glue.

It was made sure that the glue would not be agglomerated, and thus, the required viscosity of the glue was maintained.

The dried corn plant stems were mixed with the glue, and then, an agitation was carried out, so that the corn plant stems would be completely mixed with the glue.

When it was confirmed that the corn plant stems and the glue were sufficiently mixed together, the mixture was dried to a drying degree of 98%. Here, the proportion of the starch glue was 20 wt %, while that of the corn plant stems was 80 wt %. After drying the mixture, it was crushed to a size range of 0.01 mm–0.1 mm.

Then 70 wt % of the corn plant-starch mixture was mixed with 15 wt % of water and 15 wt % of melamine resin or urea resin. The melamine resin or urea resin is made as follows. A first mixture is produced by mixing water 70 wt % and formaldehyde solution 30 wt %. A second mixture is then achieved by mixing the first mixture at 70 wt % with melamine or urea 30 wt % and heating the result at a temperature of 350 degrees Centigrade. Then the resulting substance is mixed at 60 wt % with cellulose powder 40 wt %. After drying and powdering this outcome, melamine resin or urea resin is obtained. Then the final mixture was molded by a molding machine at a temperature of 100–350 degrees C. and at a pressure of 5 $Kg/Cm^2$. The product was molded at a frequency of 30–80 seconds.

EXAMPLE 5

Wheat plant stems were cut into a size range of 3–5 cm. Then the cut wheat plant stems were cleanly washed, and the washed wheat plant stems were dried to a drying degree of 98%.

Meanwhile, 20 wt % of a starch was mixed with 80 wt % of water. This mixture was agitated, so that the starch and water could be uniformly mixed. That is, the agitation was carried out while visually checking the mixing degree.

After the confirmation of the agitation result, an aging was carried out while slowly heating the mixture up to 100 degrees C. in such a manner that the mixture would not be burned. When the mixture of the starch and water was heated, it became a glue.

It was made sure that the glue would not be agglomerated, and thus, the required viscosity of the glue was maintained.

The dried wheat plant stems were mixed with the glue, and then, an agitation was carried out, so that the wheat plant stems would be completely mixed with the glue.

When it was confirmed that the wheat plant stems and the glue were sufficiently mixed together, the mixture was dried to a drying degree of 98%. Here, the proportion of the starch glue was 20 wt %, while that of the wheat plant stems was 80 wt %. After drying the mixture, it was crushed to a size range of 0.01 mm–0.1 mm.

Then 70 wt % of the wheat plant-starch mixture was mixed with 15 wt % of water and 15 wt % of melamine resin or urea resin. The melamine resin or urea resin is made as follows. A first mixture is produced by mixing water 70 wt % and formaldehyde solution 30 wt %. A second mixture is then achieved by mixing the first mixture at 70 wt % with melamine or urea 30 wt % and heating the result at a temperature of 350 degrees Centigrade. Then the resulting substance is mixed at 60 wt % with cellulose powder 40 wt %. After drying and powdering this outcome, melamine resin or urea resin is obtained. Then the final mixture was molded by a molding machine at a temperature of 100–350 degrees C. and at a pressure of 5 Kg/Cm$^2$. The produce was molded at a frequency of 30–80 seconds.

EXAMPLE 6

Bean plant stems were cut into a size range of 3–5 cm. Then the cut bean plant stems were cleanly washed, and the washed bean plant stems were dried to a drying degree of 98%.

Meanwhile, 20 wt % of a starch was mixed with 80 wt % of water. This mixture was agitated, so that the starch and water could be uniformly mixed. That is, the agitation was carried out while visually checking the mixing degree.

After the confirmation of the agitation result, an aging was carried out while slowly heating the mixture up to 100 degrees C. in such a manner that the mixture would not be burned. When the mixture of the starch and water was heated, it became a glue.

It was made sure that the glue would not be agglomerated, and thus, the required viscosity of the glue was maintained.

The dried bean plant stems were mixed with the glue, and then, an agitation was carried out, so that the bean plant stems would be completely mixed with the glue.

When it was confirmed that the bean plant stems and the glue were sufficiently mixed together, the mixture was dried to a drying degree of 98%. Here, the proportion of the starch glue was 20 wt %, while that of the bean plant stems was 80 wt %. After drying the mixture, it was crushed to a size range of 0.01 mm–0.1 mm.

Then 70 wt % of the bean plant-starch mixture was mixed with 15 wt % of water and 15 wt % of melamine resin or urea resin. The melamine resin or urea is made as follows. A first mixture is produced by mixing water 70 wt % and formaldehyde solution 30 wt %. A second mixture is then achieved by mixing the first mixture at 70 wt % with melamine or urea 30 wt % and heating the result at a temperature of 350 degrees Centigrade. Then the resulting substance is mixed at 60 wt % with cellulose powder 40 wt %. After drying and powdering this outcome, melamine resin or urea resin is obtained. Then the final mixture was molded by a molding machine at a temperature of 100–350 degrees C. and at a pressure of 5 Kg/Cm$^2$. The product was molded at a frequency of 30–80 seconds.

EXAMPLE 7

Sludge produced in alcoholic factory after extracting spirits consists of barley husks and alien substance. The sludge, when untreated, pollutes the environment. Therefore, after suitable treatment is made, the barley husks can be extracted in order to utilize in the present invention.

The barley husks abstracted from the sludge were cleanly washed. The washed barley husks were dried to a drying degree of 98%.

Meanwhile, 20 wt % of a starch was mixed with 80 wt % of water. This mixture was agitated, so that the starch and water could be uniformly mixed. That is, the agitation was carried out while visually checking the mixing degree.

After the confirmation of the agitation result, an aging was carried out while slowly heating the mixture up to 100 degrees C. in such a manner that the mixture would not be burned. When the mixture of the starch and water was heated, it became a glue.

It was made sure that the glue would not be agglomerated, and thus, the required viscosity of the glue was maintained The dried barley husks were mixed with the glue, and then, an agitation was carried out, so that the barley husks would be completely mixed with the glue.

When it was confirmed that the barley husks and the glue were sufficiently mixed together, the mixture was dried to a drying degree of 98%. Here, the proportion of the starch glue was 20 wt %, while that of the barley husks was 80 wt %. After drying the mixture, it was crushed to a size range of 0.01 mm–0.1 mm.

Then 70 wt % of the barley husks-starch mixture was mixed with 15 wt % of water and 15 wt % of melamine resin or urea resin. The melamine resin or urea resin is made as follows. A first mixture is produced by mixing water 70 wt % and formaldehyde solution 30 wt %. A second mixture is then achieved by mixing the first mixture at 70 wt % with melamine or urea 30 wt % and heating the result at a temperature of 350 degrees Centigrade. Then the resulting substance is mixed at 60 wt % with cellulose powder 40 wt %. After drying and powdering this outcome, melamine resin or urea resin is obtained. Then the final mixture was molded by a molding machine at a temperature of 100–350 degrees C. and at a pressure of 5 Kg/Cm$^2$. The product was molded at a frequency of 30–80 seconds.

What is claimed is:

1. A method of manufacturing plastic-substitute goods by using natural materials, comprising:

preparing a glue by mixing 20 wt % of a starch and 80 wt % of water together to form a glued mixture, and heating the mixture to produce the glue;

washing rice husks, and drying the washed rice husks to a drying degree of 98%;

mixing the glue and the dried rice husks together to form a material mixture, drying the material mixture to a drying degree of 98%, and crushing the dried material mixture to a size range of 0.01–0.1 mm;

mixing 70 wt % of water and 30 wt % of formaldehyde solution together to form a first resin mixture;

mixing the first resin mixture at 70 wt % with 30 wt % of melamine at a temperature 350 degree Centigrade to form a second resin mixture;

mixing 40 wt % of cellulose powder with 60 wt % of the second resin mixture to form a melamine resin;

mixing 70 wt % of the crushed material mixture, 15 wt % of water, and 15 wt % of the melamine resin to form a final mixture;

drying and powdering the final mixture; and, molding the powdered final mixture using a molding machine at a temperature of 100–350 degrees C. under a pressure of 5 $Kg/Cm^2$ at a production frequency of 30–80 seconds per product.

2. A method of manufacturing plastic-substitute goods by using natural materials, comprising:

preparing a glue by mixing 20 wt % of a starch and 80 wt % of water together to form a glue mixture, and heating the glue mixture to produce the glue;

cutting rice plant stems into 3–5 cm pieces, washing the cut rice plant stems. and drying the washed rice plant stems to a drying degree of 98%;

mixing the glue and the dried rice plant stems together to form a material mixture, drying the material mixture to a drying degree of 98%, and crushing the dried material mixture to a size range of 0.01–0.1 mm;

mixing 70 wt % of water and 30 wt % of formaldehyde solution together of form a first resin mixture;

mixing the first resin mixture at 70 wt % with 30 wt % of melamine at a temperature of 350 degree Centigrade of form a second resin mixture;

mixing 40 wt % of cellulose powder with 60 wt % of the second resin mixture to form a melamine resin;

mixing 70 wt % of the crushed material mixture, 15 wt % of water, and 15 wt % of the melamine resin to form a final mixture;

drying and powdering the final mixture; and, molding the powdered final mixture using a molding machine at a temperature of 100–350 degrees C. under pressure of 5 $Kg/Cm^2$ at a production frequency of 30–80 seconds per product.

3. A method of manufacturing plastic-substitute goods by using natural materials, comprising:

preparing a glue by mixing 20 wt % of a starch and 80 wt % of water together to form a glue mixture, and heating the glue mixture to produce the glue;

washing saw dust, and drying the washed saw dust to a drying degree of 98%;

mixing the glue and the dried saw dust together to form a material mixture, drying the material mixture to a drying degree of 98%, and crushing the dried material mixture to a size range of 0.01–0.1 mm;

mixing 70 wt % of water and 30 wt % of formaldehyde solution together to form a first resin mixture;

mixing the first resin mixture at 70 wt % with 30 wt % of melamine at a temperature of 350 degree Centigrade to form a second resin mixture;

mixing 40 wt % of cellulose powder with 60 wt % of the second resin mixture to for a melamine resin;

mixing 70 wt % of the crushed material mixture, 15 wt % of water, and 15 wt % of the melamine resin to form a final mixture;

drying and powdering the final mixture; and molding the powdered final mixture by using a molding machine at a temperature of 100–350 degrees C. under a pressure of 5 $Kg/Cm^2$at a production frequency of 30–80 seconds per product.

4. A method of manufacturing plastic-substitute goods by using natural materials, comprising of:

preparing a glue by mixing 20 wt % of a starch and 80 wt % of water together to form a glue mixture, and heating the glue mixture to produce the glue;

cutting corn plant stems into 3–5 cm pieces, washing the cut corn plant stems, and drying the washed corn plant stems to a drying degree of 98%;

mixing the glue and the dried corn plant stems together to form a material mixture, drying the material mixture to a drying degree of 98%, and crushing the dried material mixture to a drying degree of 98%, and crushing the dried material mixture to a size range of 0.01–0.1 mm;

mixing 70 wt % of water and 30 wt % of formaldehyde solution together to form a first resin mixture;

mixing the first resin mixture at 70 wt % with 30 wt % of melamine at a temperature of 350 degree Centigrade to form a second resin mixture;

mixing 40 wt % of cellulose powder with 60 wt % of the second resin mixture to form a melamine resin;

mixing 70 wt % of the crushed material mixture, 15 wt % of water, and 15 wt % of the melamine resin to form a final mixture;

drying and powdering the final mixture; and molding the powdered final mixture using a molding machine at a temperature of 100–350 degrees C. under a pressure of 5 $Kg/Cm^2$ at a production frequency of 30–80 seconds per product.

5. A method of manufacturing plastic-substitute goods by using natural materials, comprising:

preparing a glue by mixing 20 wt % of a starch and 80 wt % of water together to form a glue mixture, and heating the glue mixture to produce the glued;

cutting wheat plant stems into 3–5 cm pieces, washing the cut wheat plant stems, and drying the washed wheat plant stems to a drying degree of 98%;

mixing the glue and the dried wheat plant stems together to form a material mixture, drying the material mixture to a drying degree of 98%, and crushing the dried material mixture to a size range of 0.01–0.1 mm;

mixing 70 wt % of water and 30 wt % of formaldehyde solution together to form a first resin mixture;

mixing the first resin mixture at 70 wt % with 30 wt % of melamine at a temperature of 350 degree Centigrade to form a second resin mixture;

mixing 40 wt % of cellulose powder with 60 wt % of the second resin mixture to form a melamine resin;

mixing 70 wt % of the crushed material mixture, 15 wt % of water, and 15 wt % of the melamine resin to form a final mixture;

drying and powdering the final mixture; and molding the powdered final mixture using a molding machine at a temperature of 100–350 degrees C. under a pressure of 5 $Kg/Cm^2$ at a production frequency of 30–80 seconds per product.

6. A method of manufacturing plastic-substitute goods by using natural materials, comprising:

preparing a glue by mixing 20 wt % of a starch and 80 wt % of water together to form a glue mixture, and heating the glue mixture to produce the glue;

cutting bean plant stems into 3–5 cm pieces, washing the cut bean plant stems, and drying the washed bean plant stems to a drying degree of 98%;

mixing the glue and the dried bean plant stems together to form a material mixture, drying the material mixture to a drying degree of 98%, and crushing the dried material mixture to a size range of 0.01–0.1 mm;

mixing 70 wt % of water and 30 wt % of formaldehyde solution together to form a first resin mixture;

mixing the first resin mixture at 70 wt % with 30 wt % of melamine at a temperature of 350 degree Centigrade to form a second resin mixture;

mixing 40 wt % of cellulose powder with 60 wt % of the second resin mixture to form a melamine resin;

mixing 70 wt % of the crushed material mixture, 15 wt % of water, and 15 wt % of the melamine resin to form a final mixture;

drying and powdering the final mixture; and molding the powdered final mixture using a molding machine at a temperature of 100–350 degrees C. under a pressure of 5 $Kg/Cm^2$ at a production frequency of 30–80 seconds per product.

7. A method of manufacturing plastic-substitute goods by using natural materials, comprising:

preparing a glue by mixing 20 wt % of a starch and 80 wt % of water together to form a glue mixture, and heating the glue mixture to produce the glue;

extracting barley husks out of washed sludge produced by an alcoholic-producing factory, washing the extracted barley husks, and drying the washed barley husks to a drying degree of 98%;

mixing the glue and the dried barley husks together to form a material mixture, drying the material mixture to a drying degree of 98%, and crushing the dried material mixture to a size range of 0.01–0.1 mm;

mixing 70 wt % of water and 30 wt % of formaldehyde solution together to form a first resin mixture;

mixing the first resin mixture at 70 wt % with 30 wt % of melamine at a temperature of 350 degree Centigrade to form a second resin mixture;

mixing 40 wt % of cellulose powder with 60 wt % of the second resin mixture to form a melamine resin;

mixing 70 wt % of the crushed material mixture, 15 wt % of water, and 15 wt % of the melamine resin to form a final mixture;

drying and powdering the final mixture; and molding the powdered final mixture using a molding machine at a temperature of 100–350 degrees C. under a pressure of 5 $Kg/Cm^2$ at a production frequency of 30–80 seconds per product.

8. A method of manufacturing plastic-substitute goods by using natural materials, comprising:

preparing a glue by mixing 20 wt % of a starch and 80 wt % of water together to form a glue mixture, and by heating the glue mixture to produce the glue;

washing rice husks, and drying the washed rice husks to a drying degree of 98%;

mixing the glue and the dried rice husks together to form a material mixture, drying the material mixture to a drying degree of 98%, and crushing the dried material mixture to a size range of 0.01–0.1 mm;

mixing 70 wt % of water and 30 wt % of formaldehyde solution together to form a first resin mixture;

mixing the first resin mixture at 70 wt % with 30 wt % of urea at a temperature of 350 degree Centigrade to form a second resin mixture;

mixing 40 wt % of cellulose powder with 60 wt % of the second resin mixture to form a urea resin;

mixing 70 wt % of the crushed material mixture, 15 wt % of water, and 15 wt % of the urea resin to form a final mixture;

drying and powdering the final mixture; and molding the powdered final mixture using a molding machine at a temperature of 100–350 degrees C. under a pressure of 5 $Kg/Cm^2$ at a production frequency of 30–80 seconds per product.

9. A method of manufacturing plastic-substitute goods by using natural materials, comprising:

preparing a glue by mixing 20 wt % of a starch and 80 wt % of water together to form a glue mixture, and heating the glue mixture to produce the glue;

cutting rice plant stems into 3–5 cm pieces, washing the cut rice plant stems, and drying the washed rice plant stems to a drying degree of 98%;

mixing the glue and the dried rice plant stems together to form a material mixture, drying the material mixture to a drying degree of 98%, and crushing the dried material to a size range of 0.01–0.1 mm;

mixing 70 wt % of water and 30 wt % of formaldehyde solution together to form a first resin mixture;

mixing the first resin mixture at 70 wt % with 30 wt % of urea at a temperature of 350 degree Centigrade to form a second resin mixture;

mixing 40 wt % of cellulose powder with 60 wt % of the second resin mixture to form a urea resin;

mixing 70 wt % of the crushed material mixture, 15 wt % of water, and 15 wt % of the urea resin to form a final mixture;

drying and powdering the final mixture; and molding the powdered final mixture using a molding machine at a temperature of 100–350 degrees C. under a pressure of 5 $Kg/Cm^2$ at a production frequency of 30–80 seconds per product.

10. A method of manufacturing plastic-substitute goods by using natural materials, comprising:

preparing a glue by mixing 20 wt % of a starch and 80 wt % of water together to form a glue mixture, and heating the glue mixture to produce the glue;

washing saw dust, and drying the washed saw dust to a drying degree of 98%;

mixing the glue and the dried saw dusts together to form a material mixture, drying the material mixture to a drying degree of 98%, and crushing the dried material mixture to a size range of 0.01–0.1 mm;

mixing 70 wt % of water and 30 wt % of formaldehyde solution together to form a first resin mixture;

mixing the first resin mixture at 70 wt % with 30 wt % of urea at a temperature of 350 degree Centigrade to form a second resin mixture;

mixing 40 wt % of cellulose powder with 60 wt % of the second resin mixture to form a urea resin;

mixing 70 wt % of the crushed material mixture, 15 wt % of water, and 15 wt % of the urea resin to form final mixture;

drying and powdering the final mixture; and molding the powdered final mixture using a molding machine at a temperature of 100–350 degrees C. under a pressure of 5 $Kg/Cm^2$ at a production frequency of 30–80 seconds per product.

11. A method of manufacturing plastic-substitute goods by using natural materials, comprising:

preparing a glue by mixing 20 wt % of a starch and 80 wt % of water together to form a glue mixture, and heating the glue mixture to produce the glue;

cutting corn plant stems into 3–5 cm pieces, washing the cut corn plant stems, and drying the washed corn plant stems to a drying degree of 98%;

mixing the glue and the dried corn plant stems together to form a material mixture, drying the material mixture to a drying degree of 98%, and crushing the dried material mixture to a size range of 0.01–0.1 mm;

mixing 70 wt % of the mixture and 30 wt % of formaldehyde solution together to form a first resin mixture;

mixing the first resin mixture at 70 wt % with 30 wt % of urea at a temperature of 350 degree Centigrade to form a second resin mixture;

mixing 40 wt % of cellulose powder with 60 wt % of the second resin mixture to form a urea resin;

mixing 70 wt % of the crushed material mixture, 15 wt % of water, and 15 wt % of the urea resin to form a final mixture;

drying and powdering the final mixture; and molding the powdered final mixture using a molding machine at a temperature of 100–350 degrees C. under a pressure of 5 $Kg/Cm^2$ at a production frequency of 30–80 seconds per product.

12. A method of manufacturing plastic-substitute goods by using natural materials, comprising:

preparing a glue by mixing 20 wt % of a starch and 80 wt % of water together to form a glue mixture, and heating the glue mixture to produce the glue;

cutting wheat plant stems into 3–5 cm pieces, washing the cut wheat plant stems, and drying the washed wheat plant stems to a drying degree of 98%;

mixing the glue and the dried wheat plant stems together to form a material mixture, drying the material mixture to a drying degree of 98%, and crushing the dried material mixture to a size range of 0.01–0.1 mm;

mixing 70 wt % of water and 30 wt % of formaldehyde solution together to form a first resin mixtures;

mixing the first resin mixture at 70 wt % with 30 wt % of urea at a temperature of 350 degree Centigrade to form a second resin mixture;

mixing 40 wt % of cellulose powder with 60 wt % of the second resin mixture to form a urea resin;

mixing 70 wt % of the crushed material mixture, 15 wt % of water, and 15 wt % of the urea resin to form a final mixture;

drying and powdering the final mixture; and molding the powdered final mixture using a molding machine at a temperature of 100–350 degrees C. under a pressure of 5 $Kg/Cm^2$ at a production frequency of 30–80 seconds per product.

13. A method of manufacturing plastic-substitute goods by using natural materials, comprising:

preparing a glue by mixing 20 wt % of a starch and 80 wt % of water together to form a glue mixture, and heating the glue mixture to produce the glue;

cutting bean plant stems into 3–5 cm pieces, washing the cut bean plant stems, and drying the washed bean plant stems to a drying degree of 98%;

mixing the glue and the dried bean plant stems together to form a material mixture, drying the material mixture to a drying degree of 98%, and crushing the dried material mixture to a size range of 0.01–0.1 mm;

mixing 70 wt % of water and 30 wt % of formaldehyde solution together to form a first resin mixture;

mixing the first resin mixture at 70 wt % with 30 wt % of urea at a temperature of 350 degree Centigrade to form a second resin mixture;

mixing 40 wt % of cellulose powder with 50 wt % of the second resin mixture to form a urea resin;

mixing 70 wt % of the crushed material mixture, 15 wt % of water, and 15 wt % of the urea resin to form a final mixture;

drying and powdering the final mixture; and molding the powdered final mixture using a molding machine at a temperature of 100–350 degrees C. under a pressure of 5 $Kg/Cm^2$ at a production frequency of 30–80 seconds per product.

14. A method of manufacturing plastic-substitute goods by using natural materials, comprising:

preparing a glue by mixing 20 wt % of a starch and 80 wt % of water together to form a glue mixture, and heating the glue mixture to produce the glue;

extracting barley husks out of washed sludge produced by an alcoholic-producing factory, washing the extracted barley husks, and drying the washed barley husks to a drying degree of 98%;

mixing the glue and the dried barley husks together to form a material mixture, drying the material mixture to a drying degree of 98%, and crushing the dried material mixture to a size range of 0.01–0.1 mm;

mixing 70 wt % of water and 30 wt % of formaldehyde solution together to form a first resin mixture;

mixing the first resin mixture at 70 wt % with 30 wt % of urea at a temperature of 350 degree Centigrade to form a second resin mixture;

mixing 40 wt % of cellulose powder with 60 wt % of the second resin mixture to form a urea resin;

mixing 70 wt % of the crushed material mixture, 15 wt % of water, and 15 wt % of the urea resin to form a final mixture;

drying and powdering the final mixture; and molding the powdered final mixture using a molding matching at a temperature of 100–350 degrees C. under a pressure of 5 $Kg/Cm^2$ at a production frequency of 30–80 seconds per product.

* * * * *